(12) United States Patent
Masuda (10) Patent No.: US 6,362,930 B1
(45) Date of Patent: Mar. 26, 2002

(54) FLOPPY DISK DRIVE CHECKING DEVICE

(75) Inventor: Atsushi Masuda, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/593,857

(22) Filed: Jun. 14, 2000

(30) Foreign Application Priority Data

Jun. 14, 1999 (JP) ............................................ 11-166536

(51) Int. Cl.[7] ......................... G11B 5/016; G11B 17/02
(52) U.S. Cl. ................................. 360/99.05; 360/99.12
(58) Field of Search ........................... 360/99.05, 99.12

(56) References Cited

U.S. PATENT DOCUMENTS 5,010,427 A  4/1991 Tagushi et al.
5,264,976 A * 11/1993 Sakaguchi ............... 360/99.05
5,442,503 A *  8/1995 Komatsu .................. 360/99.05

* cited by examiner

*Primary Examiner*—A. J. Heinz
(74) *Attorney, Agent, or Firm*—Brinks Hofer Gilson & Lione (57) ABSTRACT

An FDD chucking device includes a magnetic disc on which a center hub of a floppy disk is rested and which rotates in a predetermined direction, and a driving arm equipped with a driving pin on one end thereof and an engaging member on the other end thereof. The magnetic disc is provided with a driving pin through hole, a driving arm receiving hole, and first and second thin-wall portions exposed in the through holes. The driving pin is inserted in the driving pin through hole, and the engaging member is inserted in the driving arm receiving hole to lock them onto the first and second thin-wall-portions to thereby loosely fit the driving arm in the magnetic disc.

6 Claims, 6 Drawing Sheets

FLOPPY DISK DRIVE CHECKING DEVICE

BACKGROUND OF THE INVENTION

1. Field of the Invention

The present invention relates to a floppy disk drive (hereinafter referred to as "FDD") into which a floppy disk is loaded and, more particularly, to a chucking device for chucking a floppy disk.

2. Description of the Related Art

Figure 9:
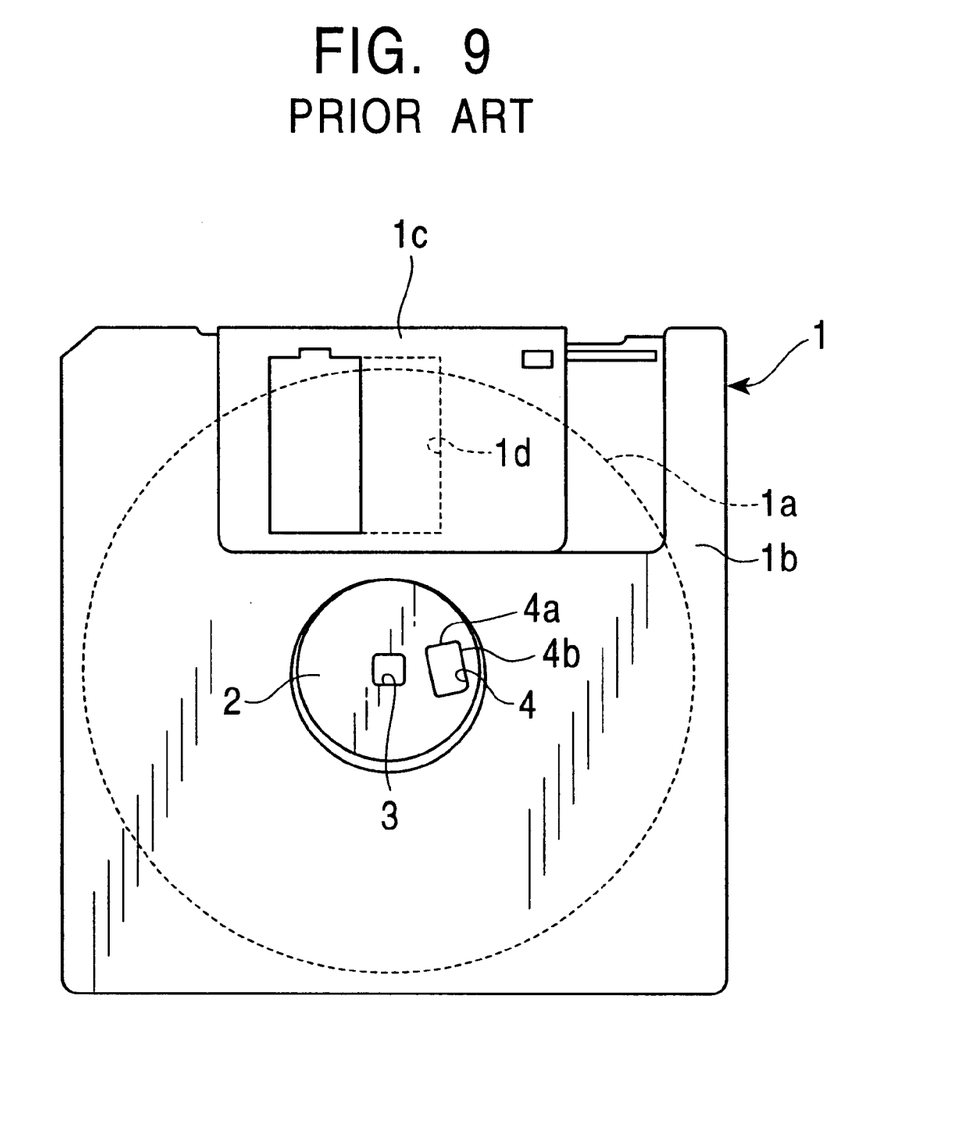
FIG. 9 is a top plan view showing a rear surface of a floppy disk.

Referring to FIG. 9, a floppy disk 1, which is a recording medium, has a disk cartridge in which a thin-film recording disk 1a is housed in a case 1b. A top surface of the case 1b has a read/write window 1d, a shutter 1c that can be opened or closed being installed to cover the read/write window 1d.

A center hub 2 formed of a metal disc is inserted to a central portion of the recording disk 1a of the floppy disk 1. In the center hub 2, a central opening 3 having a nearly square shape is formed at its central portion, and a driving hole 4 having a nearly rectangular shape is formed in its peripheral portion. The driving hole 4 has a front edge 4a at its front as observed in a counterclockwise direction in the drawing and an outer edge 4b in a direction away from the central opening 3.

Figure 7:
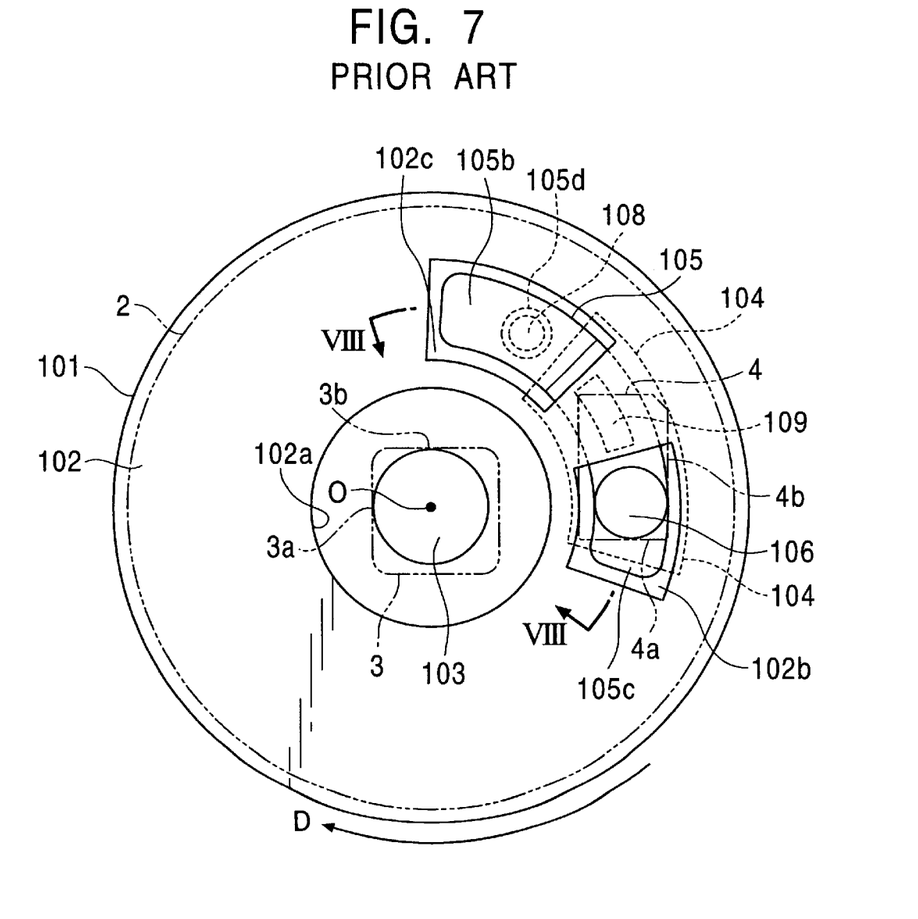
FIG. 7 is a top plan view showing a conventional chucking mechanism.
Figure 8:
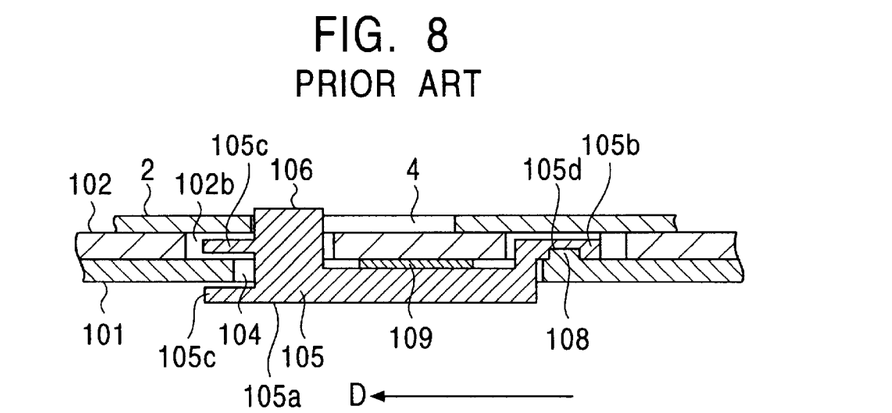
FIG. 8 is a sectional view taken at an arc line VIII—VIII of FIG. 7.

In general, the floppy disk 1 is inserted in an FDD or a magnetic disc unit, not shown, the recording disk 1a is rotated in the FDD, and the recording disk 1a is partly exposed through the opened shutter 1 c and the write/read window 1d to input or output of data to be recorded. The recording disk 1a can be easily inserted in or removed from the FDD while it is housed in the case 1b. The recording disk 1a must be accurately aligned with a rotating axis of the FDD, and its rotational speed must be accurately controlled. For this reason, a conventional FDD has been using a chucking device as shown in FIG. 7 and FIG. 8.

The FDD is provided with a rotor yoke 101 formed of a metal disc, and rotationally driven in a predetermined direction (indicated by "D" in the drawings) by a motor, not shown. A magnetic disc or a chucking magnet 102 is fixed on the rotor yoke 101.

A shaft 103 is installed in a standing manner at a center of rotation O of the rotor yoke 101. The shaft 103 extends, passing through an aperture 102a at the central portion of the magnetic disc 102, and loosely inserted in the central opening 3 of the center hub 2. In this case, "loosely inserted" means that the shaft 103 freely moves horizontally and vertically within a predetermined range.

A driving pin inserting hole 104 having an arc shape is formed along a circumference in a peripheral edge portion of the rotor yoke 101. A driving arm 105 formed in an arc shape along the circumference is loosely installed in the driving pin inserting hole 104. The driving arm 105 has a driving pin 106 that extends upward and is formed on a distal end portion 105a oriented in a rotational direction D of the rotor yoke 101. The driving pin 106 loosely penetrate a front aperture 102b formed in the magnetic disc 102 and is loosely inserted in the driving hole 4 of the center hub 2. Furthermore, the distal end portion 105a has flanges 105c and 105c that loosely clamp a portion of the rotor yoke 101 near the front of the driving pin inserting hole 104 and support the front portion of the driving arm 105 such that it can be moved horizontally and vertically within a predetermined range.

A rear end portion 105b at a rear of the driving arm 105 extends in a hook shape toward a rear on a top surface of the rotor yoke 101 from a trailing end of the driving pin inserting hole 104 formed in the rotor yoke 101, and receives a swinging shaft 108, which protrudes from a top surface of the rotor yoke 101, in a receiving hole 105d in a rear opening 102c formed in the magnetic disc 102. Thus, the driving arm 105 can horizontally swing around the swinging shaft 108 within a range of a width of the driving pin inserting hole 104.

A ferromagnetic plate 109 is installed on a top of a main body of the driving arm 105. The entire driving arm 105 is magnetically attracted to the magnetic disc 102, constantly pushing the driving pin 106 upward.

When the floppy disk 1 is inserted in the FDD, the recording disk 1a is placed on the rotor yoke 101, the center hub 2 attached to the recording disk 1a is magnetically attracted to the magnetic disc 102, and the central opening 3 of the center hub 2 receives the shaft 103 adjacent to the rotor yoke 101. At this time, the driving pin 106 projecting upward from the magnetic disc 102 is inserted in the driving hole 4 of the center hub 2.

When the driving pin 106 is not in the driving hole 4, the driving pin 106 is pushed by the center hub 2, so that it is pushed in the driving pin inserting hole 104 against the attraction force by the ferromagnetic plate 109 to prevent the driving pin 106 from projecting to the center hub 2.

The motor (not shown) is started, and while the rotor yoke 101 is being turned once in a direction D, a top portion of the driving pin 106 is slidably rotated on a bottom surface of the center hub 2 and received in the driving hole 4, then raised in the driving hole 4 by the attraction force of the ferromagnetic plate 109. As the rotor yoke 101 further rotates in the direction D under this condition, the driving pin 106 comes in contact with the front edge 4a of the driving hole 4. At the same time, the driving arm 105 swings about the swinging shaft 108 in a direction such that the driving pin 106 moves away from the center of rotation O by a load of friction between a head and the recording disk (medium) 1a, causing the driving arm 105 to come in contact also with the outer edge 4b of the driving hole 4. As a result, the driving pin 106 is supported by being abutted against the two sides, namely, the front edge 4a and the outer edge 4b of the driving hole 4.

The shaft 103 is supported by being abutted against two sides 3a and 3b of the central hole 3 of the center hub 2 on sides opposing (or away from) the driving pin 106, the center of rotation O being between the two sides. Under this condition, the center of the recording disk la coincides with the center of rotation O of the rotor yoke 101, thus completing a chucking process. In this state, the recording disk 1a of the floppy disk 1 rotates according to a controlled rotational speed of the rotor yoke 101.

As set forth above, the conventional chucking device employs the driving arm to abut the driving pin 106 against the two sides, namely, the front edge 4a and the outer edge 4b of the driving hole 4.

The driving arm 105, however, has a supporting point provided by the driving shaft 108 and the receiving hole 105d of the rear end portion 105b; hence, a clearance therebetween tends to vary, presenting a problem in that an accuracy of the clearance must be controlled.

Furthermore, the driving shaft 108 providing the supporting point must be sufficiently high to prevent it from slipping out of the receiving hole 105d of the rear end portion 105b of the driving arm 105. If the height is not accurately set, then the position of the supporting point easily varies, leading to a possibility of a failure of writing or reading data to or from the recording disk 1a.

There has been another problem in that the driving arm 105 is provided with a swinging shaft 108 that has a sufficient height for preventing it from slipping off the receiving hole 105d of the rear end portion 105b, requiring extra time and effort for machining and assembling the components with resultant increased manufacturing cost.

SUMMARY OF THE INVENTION

Accordingly, an object of the present invention is to provide an FDD chucking device which is capable of preventing eccentric rotation of a recording disk by using a reliable and inexpensive means to permit consistently accurate writing and reading, permits easy assembly, and controls manufacturing cost.

To this end, according to one aspect of the present invention, there is provided an FDD including: a magnetic disc on which a center hub of a floppy disk is rested and which rotates in a predetermined direction; and a driving arm equipped with a driving pin on one end thereof, wherein the driving pin is inserted in a through hole provided in the magnetic disc, the driving arm is loosely fitted to the magnetic disc, and a part of a peripheral portion of the through hole presses the driving pin by rotation of the magnetic disc so as to rotate the center hub of the floppy disk by the driving pin.

In a preferred form of the present invention, an engaging member is provided on the other end of the driving arm, and the engaging member and the driving pin are loosely fitted to a locking portion provided on the magnetic disc.

In another preferred form of the present invention, a part of a peripheral portion of the through hole is formed to be a slant portion inclined at an acute angle with respect to a rotational direction of the magnetic disc.

According to another aspect of the present invention, there is provided an FDD chucking device including: a magnetic disc on which a center hub of a floppy disk is rested and which rotates in a predetermined direction; and a driving arm equipped with a driving pin on one end thereof and an engaging member on the other end thereof, wherein the magnetic disc has first and second through holes and first and second locking portions composed of thin-wall portions exposed in the through holes, and the driving pin is inserted in the first through hole, while the engaging member is inserted in the second through hole, and the driving pin and the engaging member are locked by the first and second locking portions to thereby loosely fit the driving arm in the magnetic disc.

In a preferred form, the second locking portion has a protuberance on its top surface, and the engaging member is locked between the protuberance and an inner wall of the second through hole.

In another preferred form, the driving arm is provided with a ferromagnetic plate, and the ferromagnetic plate is attracted and retained to the magnetic disc to thereby project the driving pin from the through hole.

DESCRIPTION OF THE PREFERRED EMBODIMENTS

An embodiment of an FDD chucking device in accordance with the present invention will now be described in conjunction with the accompanying drawings.

Figure 1:
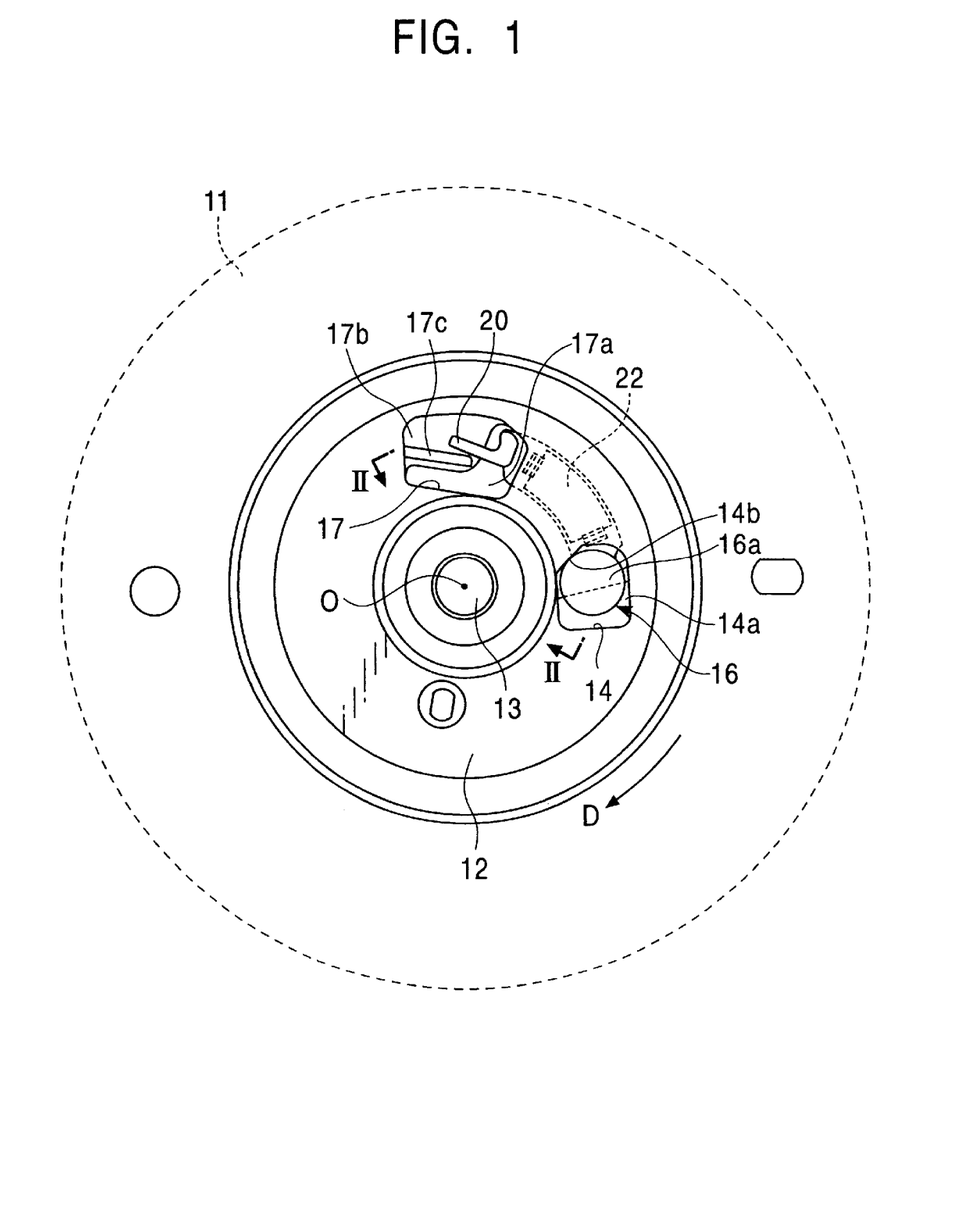
FIG. 1 is a top plan view showing an essential section of an embodiment in accordance with the present invention.
Figure 2:
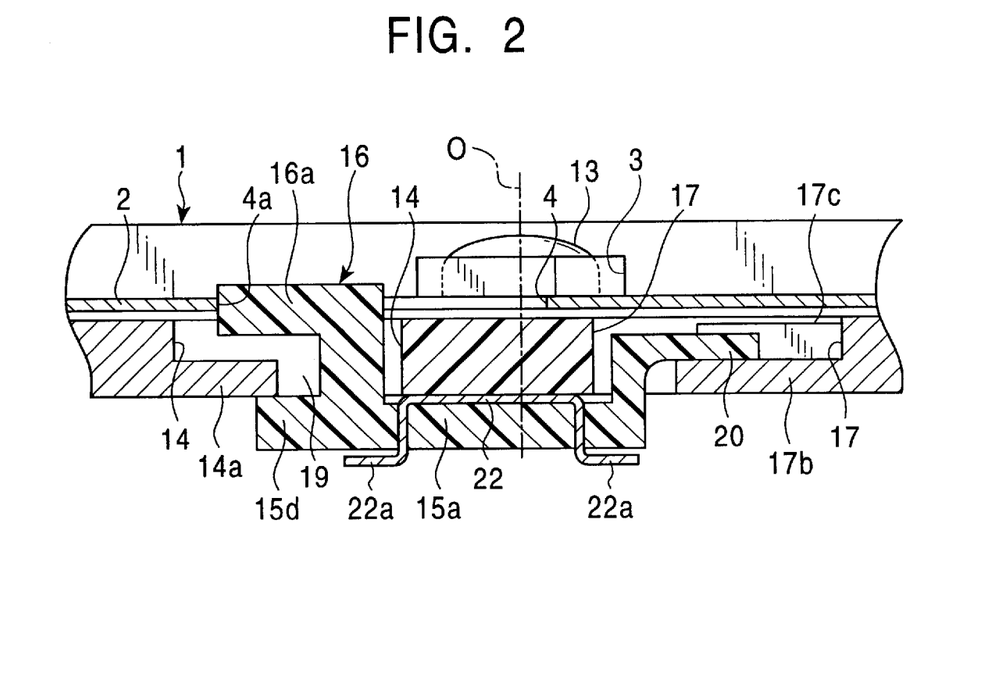
FIG. 2 is a schematic longitudinal sectional view of the embodiment of FIG. 1 in service, taken at an arc line II—II.

FIGS. 1 and 2 show a part of an FDD having an FDD chucking device in accordance with the present invention. As shown in FIGS. 1 and 2, the FDD has a rotor yoke 11 which is rotationally driven in a direction D by a motor (not shown) and composed of a metal disc. A magnetic disc or a chucking magnet 12 formed of magnetic powder and a nylon resin or the like and which has a small friction factor is integrally formed at a center of the rotor yoke 11. The magnetic disc 12 formed integrally with the rotor yoke 11 has a shaft 13 provided in a standing manner at a center of rotation O thereof.

In the magnetic disc 12, a driving pin through hole 14, which is a first through hole, and a driving arm receiving hole 17, which is a second through hole, are formed along a circumference in this order from a front with respect to the rotational direction D.

The driving pin through hole 14 has a first thin-wall portion 14a which has a wall formed from a top surface of the magnetic disc 12 such that it is thinner than the top surface, and which is the first locking portion. The first thin-wall portion 14a is provided at the front side with respect to the rotational direction D. A part at a rear side of a peripheral portion of the driving pin through hole 14 is formed to be a slant portion 14b opposing the first thin-wall portion 14a.

The slant portion 14b is machined with high accuracy so that it gradually inclines in a backward direction (in a direction opposite from the rotational direction D), that is, the slant portion 14b forms an acute angle with respect to the rotational direction D as it inclines away from the center of rotation O of the magnetic disc 12.

The driving arm receiving hole 17 having a substantially fan-like shape includes an L-shaped aperture 17a, a second thin-wall portion 17b which is formed from the top surface of the magnetic disc 12 such that it is thinner than the top surface and which is a second locking portion, and a protuberance 17c shaped like a square pillar extending along a circumference on an edge of a top surface of the second thin-wall portion 17b.

Figure 4:
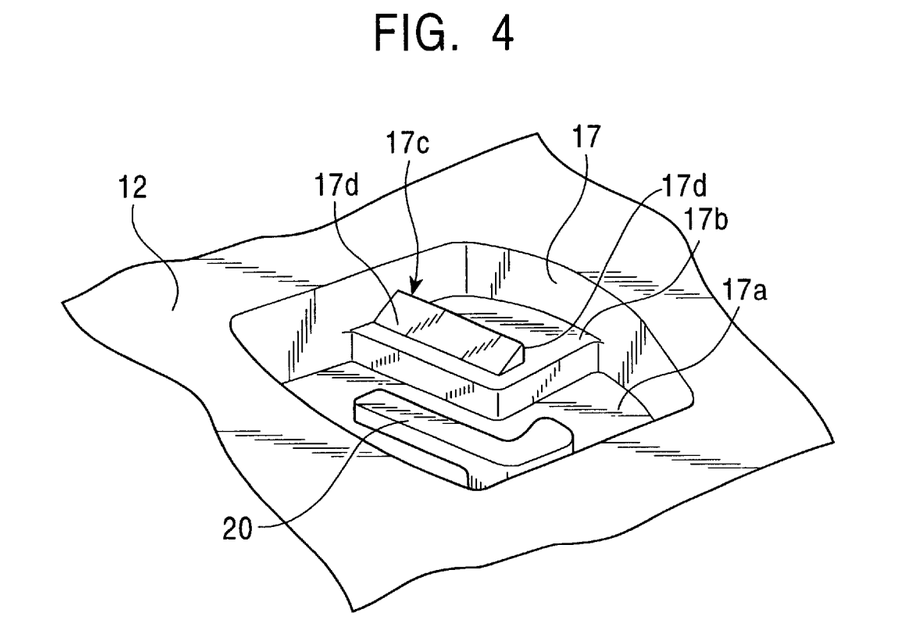
FIG. 4 is a perspective view showing an essential section of the embodiment in accordance with the present invention before the driving arm is installed.
Figure 5:
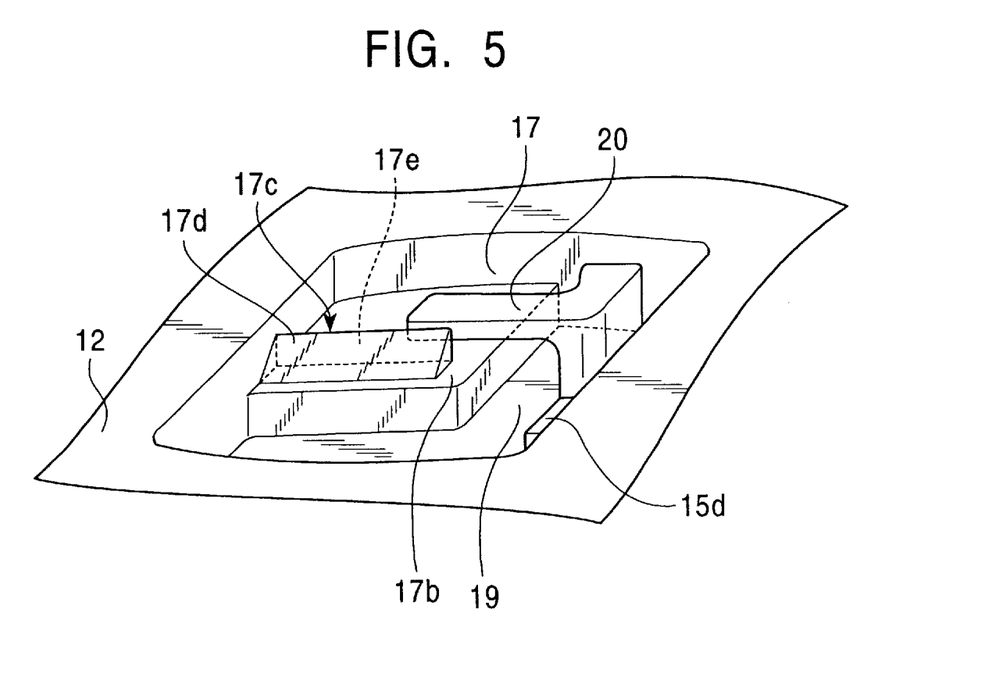
FIG. 5 is a perspective view showing an essential section of the embodiment in accordance with the present invention after the driving arm has been installed.

The protuberance 17c uses one side of the second thin-wall portion 17b as a slant surface 17d, and the other side as a vertical wall surface 17e, with a top side being a boundary, as shown in FIGS. 4 and 5.

Figure 3:
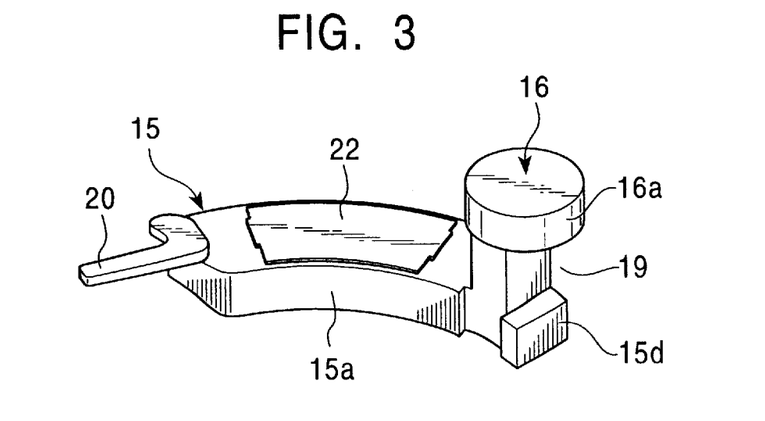
FIG. 3 is a perspective view showing a driving arm in the embodiment in accordance with the present invention.

Referring to FIG. 3, the arc driving arm 15 is formed of a polyacetal (POM) constituent or the like having a small friction factor, and constructed by a main body 15a, a driving pin 16 provided in a standing manner on one end of the main body 15a, and an engaging member 20 provided on a standing manner on a top surface of the other end of the main body 15a.

A top portion 16a of the driving pin 16 is substantially formed into a columnar shape. Below the top portion 16a, a protuberance 15d is provided so that it extends in a longitudinal direction of the main body 15a. The driving pin 16 has a U-shaped space 19 formed by a bottom surface of the top portion 16a of the driving pin 16, a side wall of the driving pin 16, and a top surface of the protuberance 15d.

The engaging member 20 has a long, narrow top, and projects from the main body 15a in its longitudinal direction so that it elastically engages when it is installed to the second thin-wall portion 17b of the magnetic disc 12.

A ferromagnetic plate 22 formed of a ferromagnetic metal plate has legs 22a formed by bending its both ends substantially at right angles. The legs 22a are inserted in holes of the main body 15a of the driving arm 15 to attach the ferromagnetic plate 22. The ferromagnetic plate 22 is formed to be wider than a top surface of the main body 15a in a radial direction of the magnetic disc 12.

In the driving arm 15 configured as set forth above, as shown in FIGS. 1 and 2, an end of the driving pin 16 formed at the front of the driving arm 15 and an end of the engaging member 20 formed at the rear of the driving arm 15 reach the driving pin through hole 14 and the driving arm receiving hole 17, respectively. These ends are circumferentially extended under the magnetic disc 12 combined into one piece with the rotor yoke 11, and loosely suspended on the magnetic disc 12.

Thus, the bottom surface of the driving pin 16 is abutted against the first thin-wall portion 14a, while the engaging member 20 is abutted against the second thin-wall portion 17b. At this time, the first thin-wall portion 14a is loosely fitted by holding it by a portion of the driving arm 15 that faces the space 19, while the engaging member 20 is loosely fitted to the second thin-wall portion 17b. This arrangement allows the entire driving arm 15 to be loosely fitted to the magnetic disc 12 so that it may freely move, and also restricts the movement of the driving arm 15 to a predetermined range by the protuberance 17c to thereby prevent both ends of the driving arm 15 from slipping out of the respective through holes, namely, the driving pin through hole 14 and the driving arm receiving hole 17.

The ferromagnetic plate 22 is normally attracted and retained upward by magnetically attracted by the magnetic disc 12 above. Hence, the driving pin 16 loosely penetrates the driving pin through hole 14 of the magnetic disc 12 and slightly juts out from the top surface of the magnetic disc 12. When the floppy disk 1 is rested on the magnetic disc 12, the driving pin 16 is loosely inserted in the driving hole 4 of the center hub 2.

Because of the smaller thickness of the second thin-wall portion 17b, the engaging member 20 does not project from the top surface of the magnetic disc 12, and only the driving pin 16 of the driving arm 15 juts out from the top surface of the magnetic disc 12.

The top portion 16a of the driving pin 16 is abutted against the front edge 4a and the outer edge 4b of the driving hole 4. A side wall at the rear of the top portion 16a of the driving pin 16 is abutted against a slant portion 14b of the driving pin through hole 14.

Referring now to FIGS. 4 and 5, a procedure for installing the driving arm 15, to which the ferromagnetic plate 22 has been attached, to the magnetic disc 12 will be described. First, the driving pin 16 of the driving arm 15 is inserted in the driving pin through hole 14 of the magnetic disc 12 from the bottom surface thereof, and a side wall of the driving pin 16 that faces the space 19 and the protuberance 15d are abutted against the first thin-wall portion 14a. Then, the ferromagnetic plate 22 attached to the driving arm 15 beforehand is retained onto the rear surface of the magnetic disc 12 by magnetic attraction, and the engaging member 20 of the driving arm 15 is inserted from the bottom surface side into an L-shaped inner peripheral portion of the driving arm receiving hole 17 as illustrated in FIG. 4.

Subsequently, the engaging member 20 is pushed toward an outer periphery while it is abutted against the slant surface 17d of the protuberance 17c until it rides over the protuberance 17c and engages the second thin-wall portion 17b, as shown in FIG. 5.

At this time, the engaging member 20 is elastic and composed of a constituent having a small friction factor, so that it smoothly slides on the slant surface 17d of the protuberance 17c which also has a small friction factor.

Once the engaging member 20 engages the second thin-wall portion 17b after riding over the slant surface 17d of the protuberance 17c, the engaging member 20 is surrounded by a wall surface 17e, which stands virtually at right angles, of the protuberance 17c and an inner wall of the driving arm receiving hole 17. This arrangement prevents the engaging member 20 from slipping out of the driving arm receiving hole 17.

Figure 6:
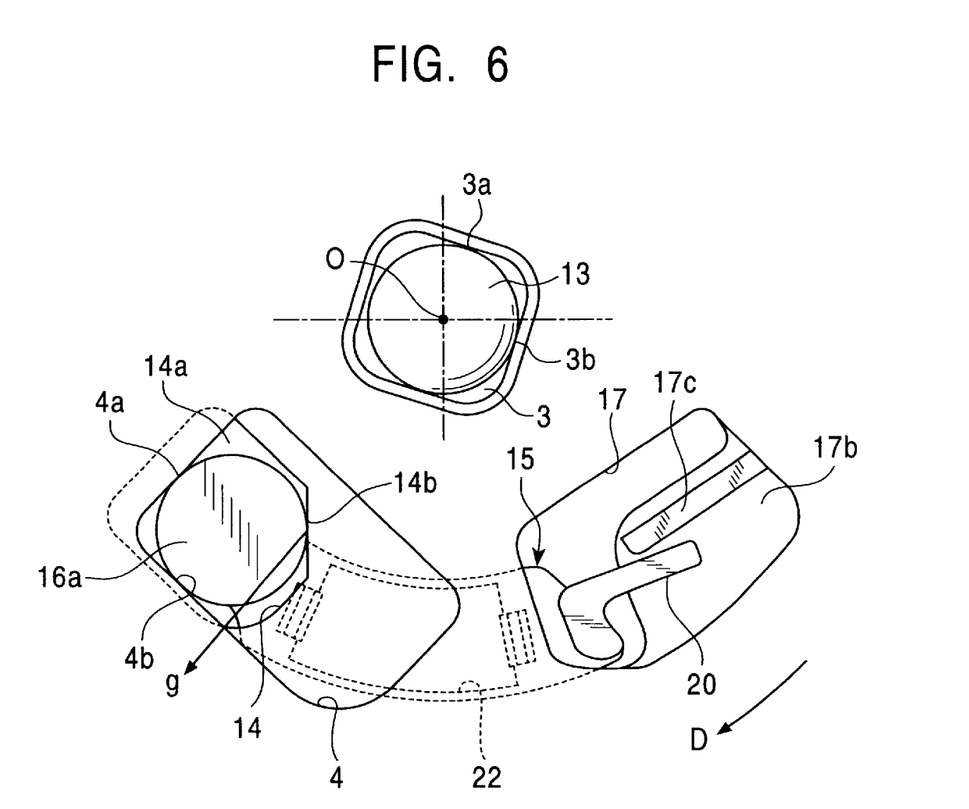
FIG. 6 is a schematic top plan view showing an operation of a chucking device in the embodiment in accordance with the present invention.

An operation of the FDD chucking device constructed as set forth above when a floppy disk 1 is loaded therein will now be described in conjunction with FIG. 6.

In the FDD, placing the floppy disk 1 on the magnetic disc 12 made integral with the rotor yoke 11 causes the shaft 13 to move into the central hole 3 of the center hub 2, and also causes the driving pin 16 jutting out of the top surface of the magnetic disc 12 to be inserted in the driving hole 4 of the center hub 2.

If the driving pin 16 is not directly inserted as described above when the floppy disk 1 is loaded, then the driving pin 16 is pushed downward by the bottom surface or front surface of the center hub 2 so that it is pushed in the driving pin through hole 14 against the magnetic attraction force of the magnetic disc 12 and the ferromagnetic plate 22. Hence, the driving pin 16 does not project on the center hub 2.

Then, a motor (not shown) is started to rotate the magnetic disc 12, which is made integral with the rotor yoke 11 in the direction D once. During this one rotation, the top portion 16a of the driving pin 16 magnetically attracted upward is slidably rotated on the bottom surface of the center hub 2 and captured in the driving hole 4. The top portion 16a of the driving pin 16 is then raised by the attraction force of the magnetic disc 12 and the ferromagnetic plate 22 until it is inserted in the driving hole 4.

In this state, as the magnetic disc 12 made integral with the rotor yoke 11 is further rotated in the direction D, the driving pin 16 slidably moves forward in the driving hole 4 and comes in contact with the front edge 4a of the driving hole 4.

Furthermore, the driving pin 16 is pushed backward by being abutted against the front edge 4a, and comes in contact with the slant portion 14b formed on the driving pin through hole 14.

Thus, the driving pin 16 is clamped by both the front edge 4a and the slant portion 14b and subjected to a pushing force.

The slant portion 14b is inclined in a direction so that it gradually leans backward as it extends away from the center of rotation O of the magnetic disc 12. Therefore, a resultant force of the pushing forces applied by the front edge 4a and the slant portion 14b produces a component force directed outward "g". The driving pin 16 is pushed outward along the accurately machined slant portion 14b, which has a small friction factor and is free of burrs, which are observed in a metal plate. Thus, the driving pin 16 reaches the outer edge 4b of the driving hole 4.

As a result, the driving pin 16 is supported by two points by abutting against the front edge 4a and the outer edge 4b of the driving hole 4, while it is positioned outward by the slant portion 14b at the same time.

At this time, the shaft 13 located in the central hole 3 is supported by two adjacent sides 3a and 3b that oppose the driving pin 16, with the center of rotation O therebetween. In this state, the center of the recording disc 1a of the floppy disk 1 is aligned with the center of rotation O of the magnetic disc 12, completing the chucking process. Hence, the recording disc 1a is able to rotate without eccentricity and in exact accordance with a controlled rotational speed of the magnetic disc 12 formed integrally with the rotor yoke 11.

As described above, in the FDD chucking device in accordance with the present invention, the engaging member 20 of the driving arm 15 is inserted in the second thin-wall portion 17b of the driving arm receiving hole 17, and freely locked in the predetermined range on the second thin-wall portion 17b so as to allow the entire driving arm 15 to be loosely fitted. The driving arm 15 can be easily installed by inserting it in the through holes, namely, the driving pin through hole 14 and the driving arm receiving hole 17, of the magnetic disc 12.

The ferromagnetic plate 22 is widely formed and attached to the top surface of the main body 15a of the driving arm 15 having the driving pin 16 and the engaging member 20 loosely fitted to the magnetic disc 12. With this arrangement, even if the driving arm 15 is accidentally subjected to a force that twists the arm outward, the driving arm 15 will be firmly retained by the magnetic attraction. In addition, the wide flat shape of the ferromagnetic plate 22 makes it possible to provide secure mechanical resistance to twists. This permits enhanced installation stability of the driving arm 15 during the rotation of the magnetic disc 12.

Furthermore, the driving arm 15 is held by the magnetic disc 12, and even if vibrations or the like take place, the driving pin 16 and the engaging member 20, which are provided such that their ends stretch outward against each other, prevent the driving arm 15 from slipping out of the driving pin through hole 14 and the driving arm receiving hole 17.

Thus, the FDD chucking device described above includes: a magnetic disc on which a center hub of a floppy disk is rested and which rotates in a predetermined direction; and a driving arm equipped with a driving pin on one end thereof, wherein the driving pin is inserted in a through hole provided in the magnetic disc, the driving arm is loosely fitted to the magnetic disc, and a part of a peripheral portion of the through hole presses the driving pin as the magnetic disc rotates thereby to rotate the center hub of the floppy disk by the driving pin. Hence, the part of the peripheral portion of the through hole of the magnetic disc having a small friction factor securely pushes the driving pin of the driving arm outward to support the driving pin, making it possible to prevent eccentric rotation of a floppy disk, thus achieving reliable chucking of the floppy disk.

Furthermore, the engaging member is provided on the other end of the driving arm, and the engaging member and the driving pin are loosely fitted to a locking portion provided on the magnetic disc. With this arrangement, the entire driving arm is installed so that it can move for a positional adjustment when the magnetic disc rotates, permitting prevention of eccentric rotation of a floppy disk.

A part of a peripheral portion of the through hole is formed to be a slant portion inclined at an acute angle with respect to a rotational direction of the magnetic disc. With this arrangement, as the magnetic disc rotates, the driving pin of the driving arm slides along the slant portion and retained on the outer peripheral side, allowing reliable chucking of a floppy disk to be accomplished. Moreover, the driving pin is pressed and abutted against a part of the peripheral portion of the through hole of the magnetic disc, which has been accurately machined; hence, highly accurate chucking can be achieved, permitting error-free writing or reading to or from a floppy disk.

Furthermore, the FDD chucking device includes: a magnetic disc on which a center hub of a floppy disk is rested and which rotates in a predetermined direction; and a driving arm equipped with a driving pin on one end thereof and an engaging member on the other end thereof, wherein the magnetic disc has first and second through holes and first and second locking portions composed of thin-wall portions exposed in the through holes, and the driving pin is inserted in the first through hole, while the engaging member is inserted in the second through hole, and the driving pin and the engaging member are locked by the first and second locking portions to thereby loosely fit the driving arm in the magnetic disc. The driving arm, except the driving pin, is not projected from the top surface of the magnetic disc, so that the driving arm does not hit the center hub of the floppy disk, permitting smooth rotation. In addition, the installation of the driving arm to the magnetic disc can be completed with great ease simply by inserting the driving arm in the through hole of the magnetic disc. This permits higher manufacturing efficiency to be achieved.

Furthermore, the second locking portion has a protuberance on its top surface, and the engaging member is locked between the protuberance and an inner wall of the second through hole. With this arrangement, the installation of the driving arm to the magnetic disc can be completed with great ease simply by inserting the driving arm in the through hole of the magnetic disc. This permits higher manufacturing efficiency to be achieved. In addition, the engaging member provided on the driving arm can be prevented from slipping off from the engaging portion.

Furthermore, the driving arm is provided with a ferromagnetic plate, and the ferromagnetic plate is attracted and retained to the magnetic disc to thereby projecting the driving pin from the through hole. With this arrangement, the driving pin constantly juts out of the top surface of the magnetic disc to securely engage the center hub of the floppy disk, enabling reliable chucking of the floppy disk to be achieved.

Even if the driving pin is pushed by the center hub of the floppy disk and temporarily sunk from the top surface of the magnetic disc, the driving pin can be immediately projected back again by the ferromagnetic plate, thus enabling improved chucking reliability to be achieved.

What is claimed is:

1. A floppy disk drive (FDD) chucking device comprising:
    a magnetic disc to attract and secure a center hub of a floppy disk and which rotates in a predetermined direction; and
    a driving arm equipped with a driving pin on one end thereof, wherein the driving pin is inserted in a through hole provided in the magnetic disc, and the driving arm is loosely fitted to the magnetic disc whereby magnetic attraction between said drive arm and magnetic disc biases said driving arm toward said magnetic disc;

a part of a peripheral portion of the through hole presses the driving pin as the magnetic disc rotates; and the center hub of the floppy disk is rotated by the driving pin.

2. An FDD chucking device according to claim 1, wherein an engaging member is provided on the other end of the driving arm, and the engaging member and the driving pin are loosely fitted to a locking portion provided on the magnetic disc.

3. An FDD chucking device according to claim 1, wherein a part of a peripheral portion of the through hole is formed to be a slant portion inclined at an acute angle with respect to a rotational direction of the magnetic disc.

4. An FDD chucking device according to claim 1, wherein the driving arm is provided with a ferromagnetic plate, and the ferromagnetic plate is attracted and retained to the magnetic disc to thereby project the driving pin from the first through hole.

5. A floppy disk drive (FDD) chucking device comprising:

a magnetic disc to attract and secure a center hub of a floppy disk and which rotates in a predetermined direction; and a driving arm equipped with a driving pin on one end thereof and an engaging member on the other end thereof, wherein the magnetic disc has first and second through holes and first and second locking portions composed of thin-wall portions exposed in the through holes; and the driving pin is inserted in the first through hole, while the engaging member is inserted in the second through hole, and the driving pin and the engaging member are locked by the first and second locking portions to thereby loosely fit the driving arm in the magnetic disc.

6. An FDD chucking device according to claim 5, wherein the second locking portion has a protuberance on its top surface, and the engaging member is locked between the protuberance and an inner wall of the second through hole.

* * * * *

UNITED STATES PATENT AND TRADEMARK OFFICE
CERTIFICATE OF CORRECTION

PATENT NO. : 6,362,930 B1
DATED : March 26, 2002
INVENTOR(S) : Atsushi Masuda It is certified that error appears in the above-identified patent and that said Letters Patent is hereby corrected as shown below:

Title page, Item [54] and Column 1, line 1,
Delete "CHECKING" and substitute -- CHUCKING --

Signed and Sealed this

Twenty-fifth Day of March, 2003

JAMES E. ROGAN
*Director of the United States Patent and Trademark Office*